US 12,291,476 B2

(12) United States Patent
Nagata et al.

(10) Patent No.: US 12,291,476 B2
(45) Date of Patent: May 6, 2025

(54) PRODUCTION METHOD FOR GLASS ROLL

(71) Applicant: Nippon Electric Glass Co., Ltd., Shiga (JP)

(72) Inventors: Daisuke Nagata, Shiga (JP); Hiroki Mori, Shiga (JP); Masaya Fujisaki, Shiga (JP); Yohei Kirihata, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 455 days.

(21) Appl. No.: 17/770,119

(22) PCT Filed: Oct. 13, 2020

(86) PCT No.: PCT/JP2020/038632
§ 371 (c)(1),
(2) Date: Apr. 19, 2022

(87) PCT Pub. No.: WO2021/106397
PCT Pub. Date: Jun. 3, 2021

(65) Prior Publication Data
US 2022/0363581 A1    Nov. 17, 2022

(30) Foreign Application Priority Data
Nov. 27, 2019  (JP) ................................ 2019-214273

(51) Int. Cl.
C03B 35/14    (2006.01)
(52) U.S. Cl.
CPC .......... *C03B 35/14* (2013.01); *C03B 2225/02* (2013.01)

(58) Field of Classification Search
CPC ..... C03B 35/14; C03B 2225/02; C03B 35/18; C03B 35/182; C03B 17/064
See application file for complete search history.

(56) References Cited

U.S. PATENT DOCUMENTS 1,152,596 A  *  9/1915  Boucher ................. D21F 3/105
                                                118/DIG. 15
2012/0111054 A1    5/2012  Blanding et al.
(Continued)

FOREIGN PATENT DOCUMENTS

CN    209242243    8/2019
CN    110392662    10/2019
(Continued)

OTHER PUBLICATIONS

International Search Report issued Dec. 15, 2020 in International (PCT) Application No. PCT/JP2020/038632.
(Continued)

*Primary Examiner* — Erin Snelting
(74) *Attorney, Agent, or Firm* — Wenderoth, Lind & Ponack, L.L.P.

(57) ABSTRACT

Provided is a method of manufacturing a glass roll (GR), including: a conveying step of conveying a band-shaped glass film (G2) in a lateral conveying direction by a conveying device (4); and a roll-up step of rolling up the glass film (G2) into a roll shape. The conveying step includes an inspection step of measuring a state of each of end portions (Gd, Ge) in a width direction of the glass film (G2) by a detection unit (19a, 19b) under a state in which a tension is applied to the glass film (G2) that passes through an intermediate conveying region (MS) of the conveying device (4) by a tension applying portion.

21 Claims, 6 Drawing Sheets

(56) References Cited

U.S. PATENT DOCUMENTS

| | | | |
|---|---|---|---|
| 2015/0160140 A1 | 6/2015 | Kang et al. | |
| 2017/0001898 A1* | 1/2017 | Ortner et al. | |
| 2017/0197864 A1* | 7/2017 | Aburada | B65H 23/1888 |
| 2020/0164545 A1 | 5/2020 | Mitsugi et al. | |
| 2020/0361807 A1 | 11/2020 | Ikai et al. | |

FOREIGN PATENT DOCUMENTS

| | | |
|---|---|---|
| JP | 2012-096989 | 5/2012 |
| JP | 2012-236675 | 12/2012 |
| JP | 2015-530958 | 10/2015 |
| JP | 2016-113342 | 6/2016 |
| JP | 2016-204176 | 12/2016 |
| JP | 2017-514785 | 6/2017 |
| WO | 2013/181060 | 12/2013 |
| WO | 2019/049646 | 3/2019 |

OTHER PUBLICATIONS

Office Action issued Jan. 4, 2024 in corresponding Taiwanese Patent Application No. 109136354, with English translation of the Search Report.

International Preliminary Report on Patentability and Written Opinion of the International Search Authority dated May 17, 2022 in International (PCT) Application No. PCT/JP2020/038632.

Office Action issued Nov. 15, 2024 in corresponding Chinese Patent Application No. 202080069069.3, with English-language Translation.

\* cited by examiner

PRODUCTION METHOD FOR GLASS ROLL

TECHNICAL FIELD

The present invention relates to a method of manufacturing a glass roll by rolling up a glass film into a roll shape.

BACKGROUND ART

In recent years, a small thickness and a small weight are demanded for mobile terminals such as smartphones and tablet PCs which are rapidly spread. Thus, in the current condition, there is an increasing demand for reduction in thickness of glass substrates to be incorporated into those terminals. Under such current condition, a glass film which is a glass substrate reduced in thickness as small as that of a film (for example, thickness equal to or smaller than 300 µm) is now developed and manufactured.

In some cases, manufacturing steps for the glass film include a step of manufacturing a glass roll by rolling up a glass ribbon, which serves as a base material of the glass roll, into a roll shape. For example, in Patent Literature 1, there is disclosed a method involving pulling a glass ribbon formed into a sheet shape from a molten glass with two rollers (take-over rollers) by a down-draw method, to thereby continuously produce the glass ribbon, and rolling up the glass ribbon by a roll-up device to manufacture a glass roll (see FIG. 4 and FIG. 6 of Patent Literature 1).

In this method of manufacturing a glass roll, measures for reducing a so-called bow-shaped curved defect that occurs during the production of the glass ribbon are taken. Specifically, as disclosed in FIG. 6 of Patent Literature 1, a measuring device for measuring a bow-shaped curved defect is arranged in front of a roll-up device.

This measuring device includes two pairs of rollers arranged at intervals in a longitudinal direction of the glass ribbon, and two distance sensors arranged between the two pairs of rollers. The two pairs of rollers are configured to convey the glass ribbon in a region therebetween under a state in which the glass ribbon is loosened downward. In order to measure the length of each of end portions in a width direction of the loosened glass ribbon, the two distance sensors are configured to measure the distance between each of the distance sensors and each of the end portions.

According to this method, the degree of a bow-shaped curved defect caused by the difference between the length regarding one end portion of the glass ribbon and the length regarding the other end portion thereof can be measured based on the distances measured by the two distance sensors.

CITATION LIST

Patent Literature 1: JP 2017-514785 A1

SUMMARY OF INVENTION

Technical Problem

However, in the above-mentioned method of manufacturing a glass roll, the measurement by the distance sensors is performed under a state in which a part of the glass film (glass ribbon) is loosened. Accordingly, when shaking and the like caused by vibration during conveyance occur in the loosened part, accurate measurement cannot be performed.

In view of the foregoing, a technical object of the present invention is to measure the state of each of end portions in a width direction of a glass film forming a glass roll with satisfactory accuracy.

Solution to Problem

In order to solve the above-mentioned problem, according to the present invention, there is provided a method of manufacturing a glass roll, comprising: a conveying step of conveying a band-shaped glass film in a lateral conveying direction by a conveying device; and a roll-up step of rolling up the glass film into a roll shape, wherein the conveying device comprises: a first support portion and a second support portion which are arranged at an interval along the lateral conveying direction, and which are each configured to support the glass film; an intermediate conveying region formed between the first support portion and the second support portion; a tension applying portion configured to apply a tension to the glass film that passes through the intermediate conveying region; and a detection unit configured to measure a state of each of end portions in a width direction of the glass film that passes through the intermediate conveying region, and wherein the conveying step comprises an inspection step of measuring the state of each of the end portions of the glass film by the detection unit under a state in which the tension is applied to the glass film that passes through the intermediate conveying region by the tension applying portion.

According to this configuration, the glass film can be conveyed in a stable posture through application of a tension to the glass film. When the inspection step is performed in this state, the state of each of the end portions in the width direction of the glass film can be measured by the detection unit with satisfactory accuracy.

The detection unit may comprise: a first detection unit configured to measure a distance from one end portion in the width direction of the glass film that passes through the intermediate conveying region; and a second detection unit configured to measure a distance from another end portion in the width direction of the glass film.

According to this configuration, the length of one end portion of the glass film and the length of another end portion thereof can be obtained based on the data regarding the distance of one end portion of the glass film measured by the first detection unit and the data regarding the distance of another end portion of the glass film measured by the second detection unit. The quality of the glass film (glass roll) can be determined based on the difference between the lengths.

The tension applying portion may comprise: a roll-out device configured to feed out the glass film; and a roll-up device configured to roll-up the glass film into a roll shape. When the inspection step is performed under a state in which the tension is applied to the glass film by the roll-out device and the roll-up device, the measurement by the detection unit can be performed with satisfactory accuracy.

The method of manufacturing a glass roll according to the present invention may further comprise, before the conveying step, a forming step of forming the glass film by forming a molten glass by a forming device, and the tension applying portion may comprise: a fixing conveying portion configured to convey the glass film under a state in which the glass film is fixed and held; and a roll-up device configured to roll-up the glass film into a roll shape.

When the inspection step is performed under a state in which the tension is applied to the glass film by the fixing conveying portion and the roll-up device, the measurement by the detection unit can be performed on the glass film after the forming step with satisfactory accuracy.

The fixing conveying portion may comprise a suction conveyor. With the suction conveyor, the tension can be suitably applied to the glass film while the glass film is conveyed.

The conveying device may be arranged in the intermediate conveying region, and may comprise an auxiliary conveying device configured to convey the glass film, and the detection unit may be arranged above the auxiliary conveying device.

In the forming step, the forming device may adjust the tension applied to the glass film in accordance with the state of each of the end portions of the glass film detected by the detection unit. With this adjustment, a glass film having high dimensional accuracy can be produced, and eventually a high-quality glass roll can be manufactured.

Further, in the method of manufacturing a glass roll according to the present invention, the roll-up device is capable of applying the tension to the glass film that passes through the intermediate conveying region with roll-up force.

Advantageous Effects of Invention

According to the present invention, it is possible to measure the state of each of the end portions in the width direction of the glass film forming the glass roll with satisfactory accuracy.

DESCRIPTION OF EMBODIMENTS

Now, an embodiment of the present invention is described with reference to the drawings. In each of FIG. 1 to FIG. 7, a method of manufacturing a glass roll according to one embodiment of the present invention is illustrated.

Figure 1:
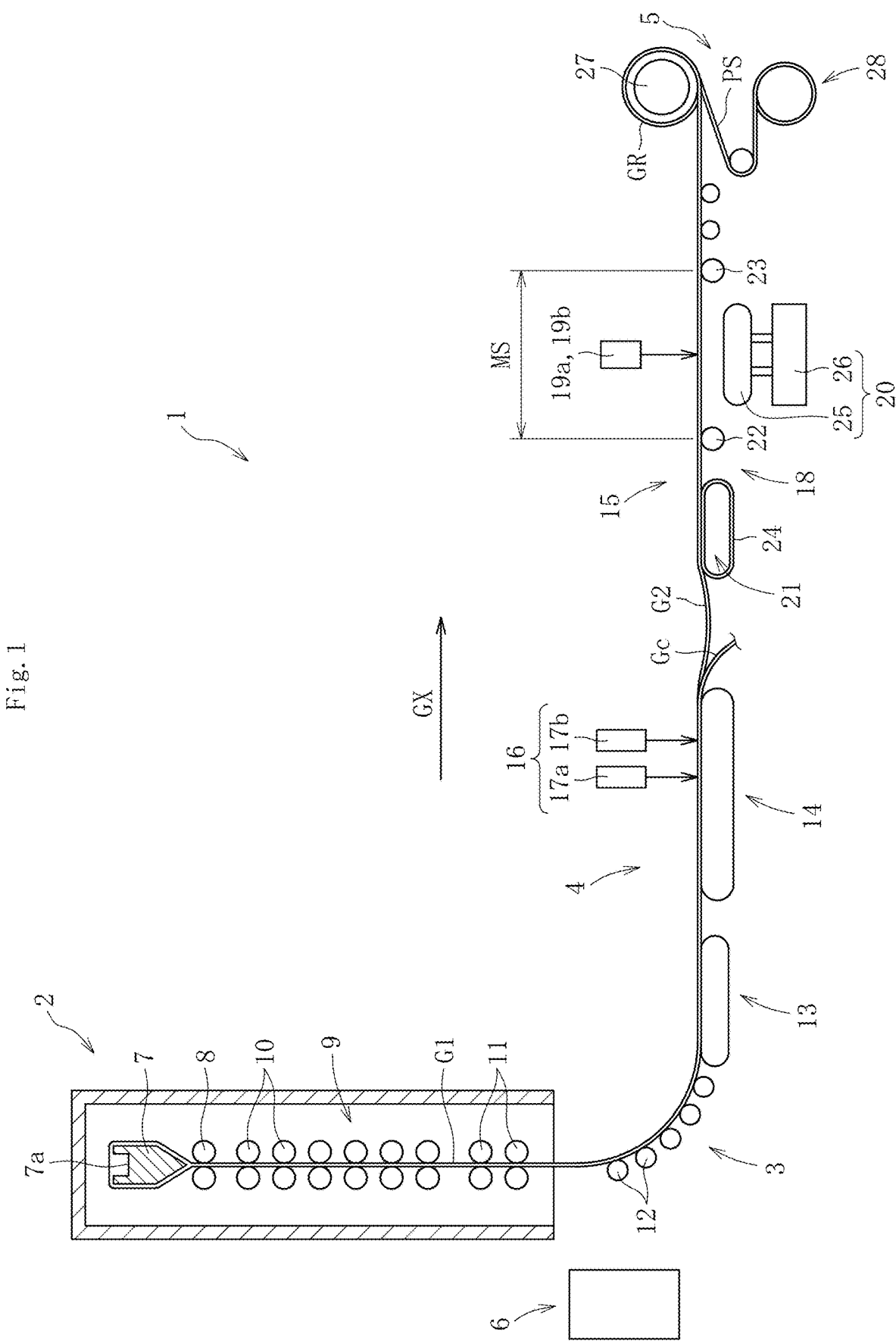
FIG. 1 is a side view for illustrating a method of manufacturing a glass roll according to one embodiment of the present invention.
Figure 2:
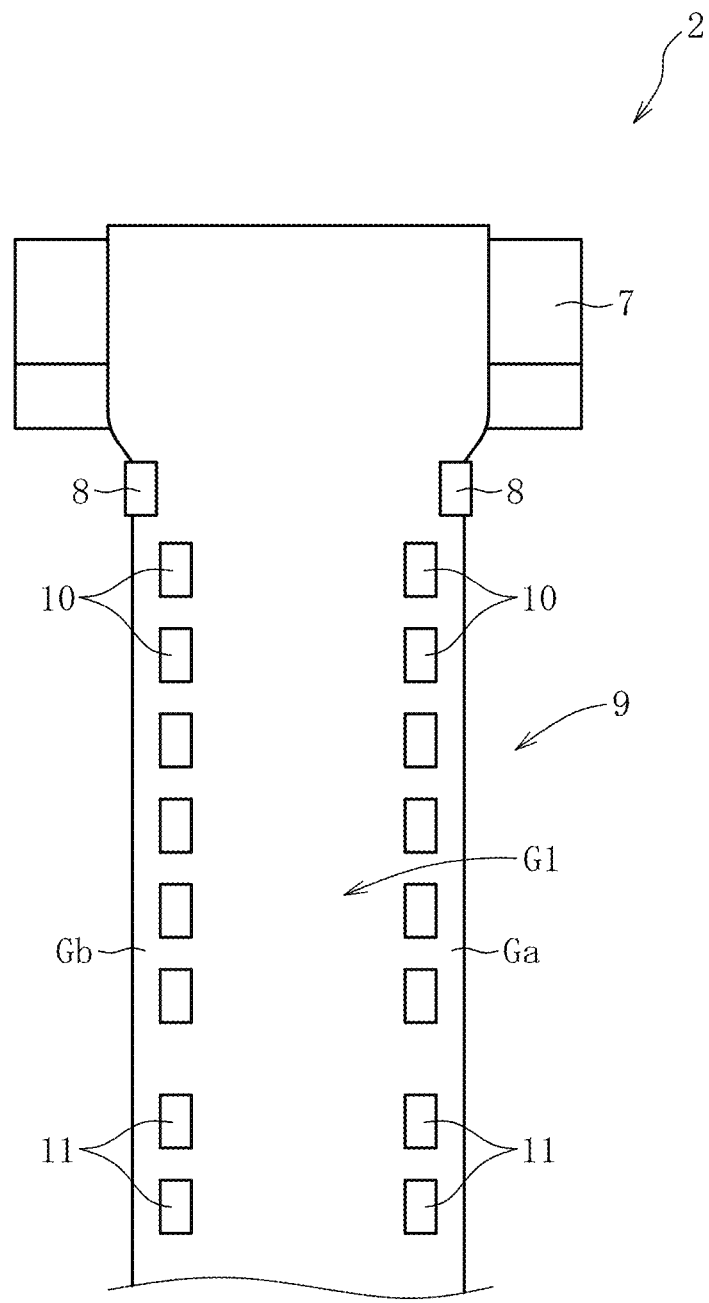
FIG. 2 is a front view for illustrating a forming step in the method of manufacturing a glass roll.
Figure 3:
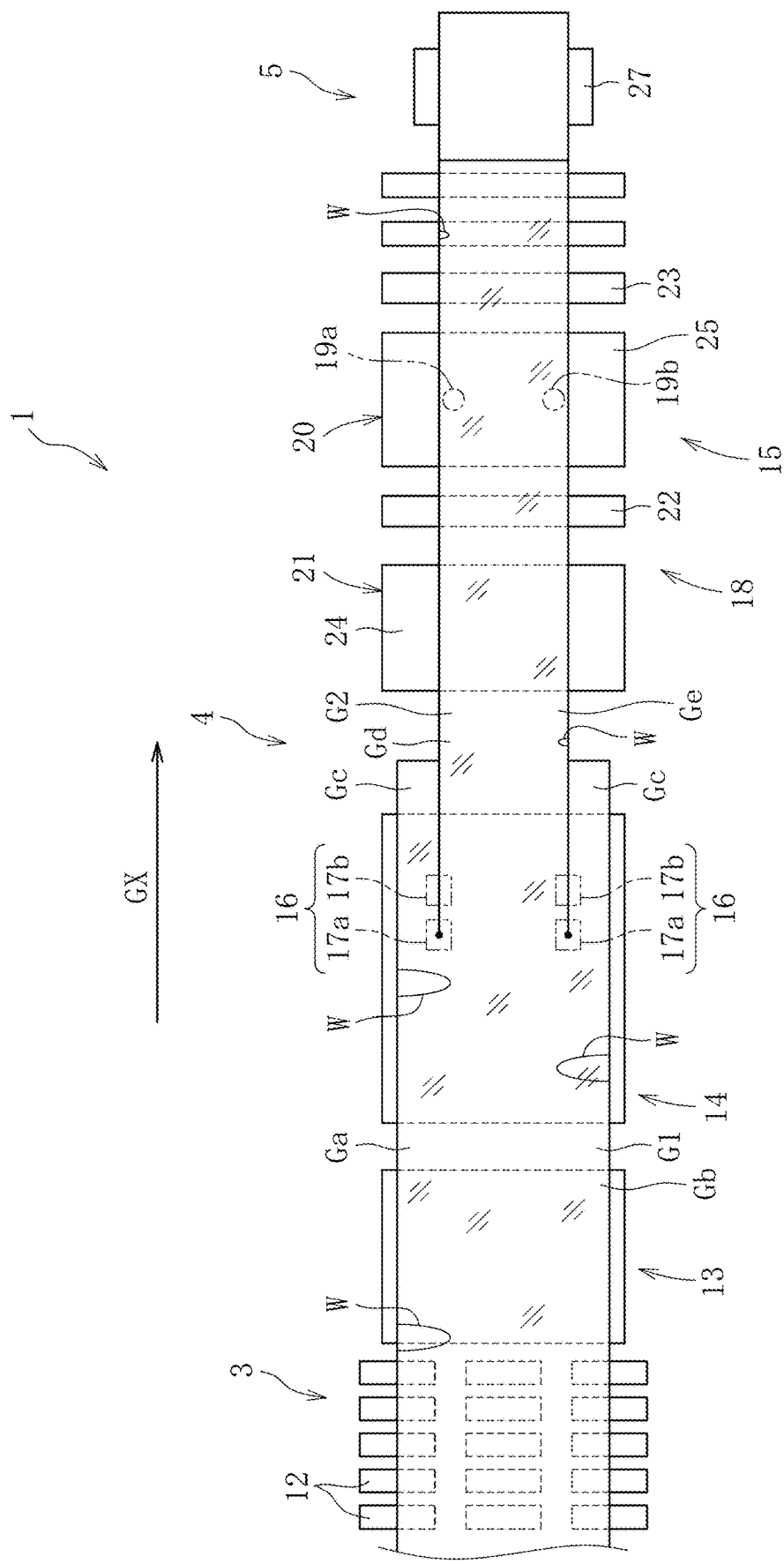
FIG. 3 is a plan view for illustrating a conveying step in the method of manufacturing a glass roll.

In each of FIG. 1 to FIG. 3, there is illustrated an overall configuration of a manufacturing apparatus for a glass roll to be used in this method. A manufacturing apparatus 1 comprises: a forming device 2 configured to form a band-shaped base glass film (glass ribbon) G1 from a molten glass; a direction conversion device 3 configured to convert a traveling direction of the base glass film G1; a lateral conveying device 4 configured to convey the base glass film G1 along a lateral conveying direction GX; a roll-up device 5 configured to roll-up a product glass film G2 obtained by removing unnecessary portions (selvage portions) of end portions Ga and Gb in a width direction of the base glass film G1 into a roll shape to form a glass roll GR; and a control device 6 configured to perform various controls regarding each of the devices 2 to 5.

In this embodiment, the thickness of the product glass film G2 is set to 300 μm or less, preferably 100 μm or less.

As illustrated in FIG. 1 and FIG. 2, the forming device 2 comprises: a forming body 7 having a substantially wedge shape in sectional view in which an overflow groove 7a is formed on an upper end portion thereof; edge rollers 8 arranged immediately below the forming body 7 and configured to sandwich a molten glass overflowing from the forming body 7 from both front and back surface sides of the molten glass; and an annealer 9 arranged immediately below the edge rollers 8.

The forming device 2 is configured to cause the molten glass overflowing from an upper part of the overflow groove 7a of the forming body 7 to flow down along both side surfaces of the forming body 7 to be joined at a lower end of the forming body 7, to thereby form the molten glass into a film shape. The edge rollers 8 are configured to control shrinkage of the molten glass in a width direction to form the base glass film G1 having a predetermined width. The annealer 9 is configured to perform strain removal treatment on the base glass film G1. The annealer 9 comprises annealer rollers 10 arranged in a plurality of stages in a vertical direction.

Support rollers 11 configured to sandwich the base glass film G1 from both the front and back surface sides are arranged below the annealer 9. A tension for encouraging thinning of the base glass film G1 is applied between the support rollers 11 and the edge rollers 8 or between the support rollers 11 and the annealer rollers 10 at any one position.

The direction conversion device 3 is configured to convert the traveling direction of the base glass film G1 from a vertically downward direction to the lateral conveying direction GX. The direction conversion device 3 is arranged at a position below the support rollers 11. In the direction conversion device 3, a plurality of guide rollers 12 configured to guide the base glass film G1 are arranged in a curved form. Those guide rollers 12 are configured to guide the base glass film G1, which has been conveyed in the vertical direction, in the lateral direction.

The lateral conveying device 4 is arranged in a forward traveling direction with respect to (on a downstream side of) the direction conversion device 3. The lateral conveying device 4 comprises: a first conveying device 13; a second conveying device 14; and a third conveying device 15. The first conveying device 13 is arranged on a downstream side of the direction conversion device 3. The second conveying device 14 is arranged on a downstream side of the first conveying device 13. The third conveying device 15 is arranged on a downstream side of the second conveying device 14.

The first conveying device 13 and the second conveying device 14 are each formed of, for example, a belt conveyor, but may be each formed of a roller conveyor or other various conveyors instead of the belt conveyor. The first conveying device 13 is configured to continuously convey the base glass film G1 having passed through the direction conversion device 3 to a downstream side along the lateral conveying direction GX.

As illustrated in FIG. 1 and FIG. 3, the second conveying device 14 comprises a cutting portion 16 configured to cut the end portions (selvage portions) Ga and Gb in the width direction of the base glass film G1 as non-product portions Gc. The cutting portion 16 is configured to cut the base glass film G1 by, for example, laser cleavage. However, the present invention is not limited to this cutting mode. The cutting portion 16 comprises: a pair of laser irradiation devices 17a; and a pair of cooling devices 17b arranged on a downstream side of the laser irradiation devices 17a. The cutting portion 16 is configured to, while the base glass film G1 is conveyed, heat a predetermined site of the base glass film G1 through irradiation with a laser beam from the laser irradiation device 17a, and then release a cooling medium from the cooling device 17b to cool the heated site.

The third conveying device 15 comprises: a conveying portion 18 configured to convey the product glass film G2 along the lateral conveying direction GX; detection units 19a and 19b each configured to measure the distance from the product glass film G2; and an auxiliary conveying device 20.

The conveying portion 18 comprises: a fixing conveying portion 21 configured to convey the product glass film G2 to a downstream side under a state in which the product glass film G2 is fixed and held; and a first support portion 22 and a second support portion 23 each configured to support the product glass film G2.

The fixing conveying portion 21 is configured to convey the product glass film G2, and in addition, functions as a tension applying portion configured to apply a tension to the product glass film G2. The fixing conveying portion 21 is connected to the control device 6. The fixing conveying portion 21 is formed of, for example, a suction conveyor including a conveyor belt 24.

In this embodiment, the expression "fixed and held" means that the conveyor belt 24 and a site of the product glass film G2 that is being conveyed are not relatively displaced from each other during conveyance of the product glass film G2 by the fixing conveying portion 21. That is, under a state in which the product glass film G2 is fixed and held, the surface of the conveyor belt 24 and a part of a lower surface of the product glass film G2 that is brought into contact with the surface are not relatively displaced from each other during conveyance.

The conveyor belt 24 has a large number of suction holes (not shown) that penetrate through the conveyor belt 24 in a thickness direction. In addition, a negative pressure generating device (not shown) connected to a vacuum pump or the like is arranged on an inner peripheral side of the conveyor belt 24. The negative pressure generating device is configured to generate a negative pressure for sucking the product glass film G2 through the suction holes.

As a result, the surface of the conveyor belt 24 fixes and holds the lower surface of the product glass film G2 by suction. The product glass film G2 in a state of being sucked by the conveyor belt 24 is conveyed to a downstream side of a conveyance path at a conveyance speed that is the same as the feed speed of the conveyor belt 24. The conveyor belt 24 may be configured to suck the entire width of the product glass film G2 in the width direction, or may be configured to suck only a part in the width direction.

The first support portion 22 and the second support portion 23 are formed of rollers configured to support the lower surface of the product glass film G2. Each of the support portions 22 and 23 may be a free roller or may be driven to rotate by a drive device such as a motor. The first support portion 22 and the second support portion 23 are separated from each other in the lateral conveying direction GX. The first support portion 22 is arranged on a downstream side of the fixing conveying portion 21. The second support portion 23 is arranged on a downstream side of the first support portion 22.

An intermediate conveying region MS through which the product glass film G2 having a tension applied thereto is caused to pass is formed between the first support portion 22 and the second support portion 23.

Figure 4:
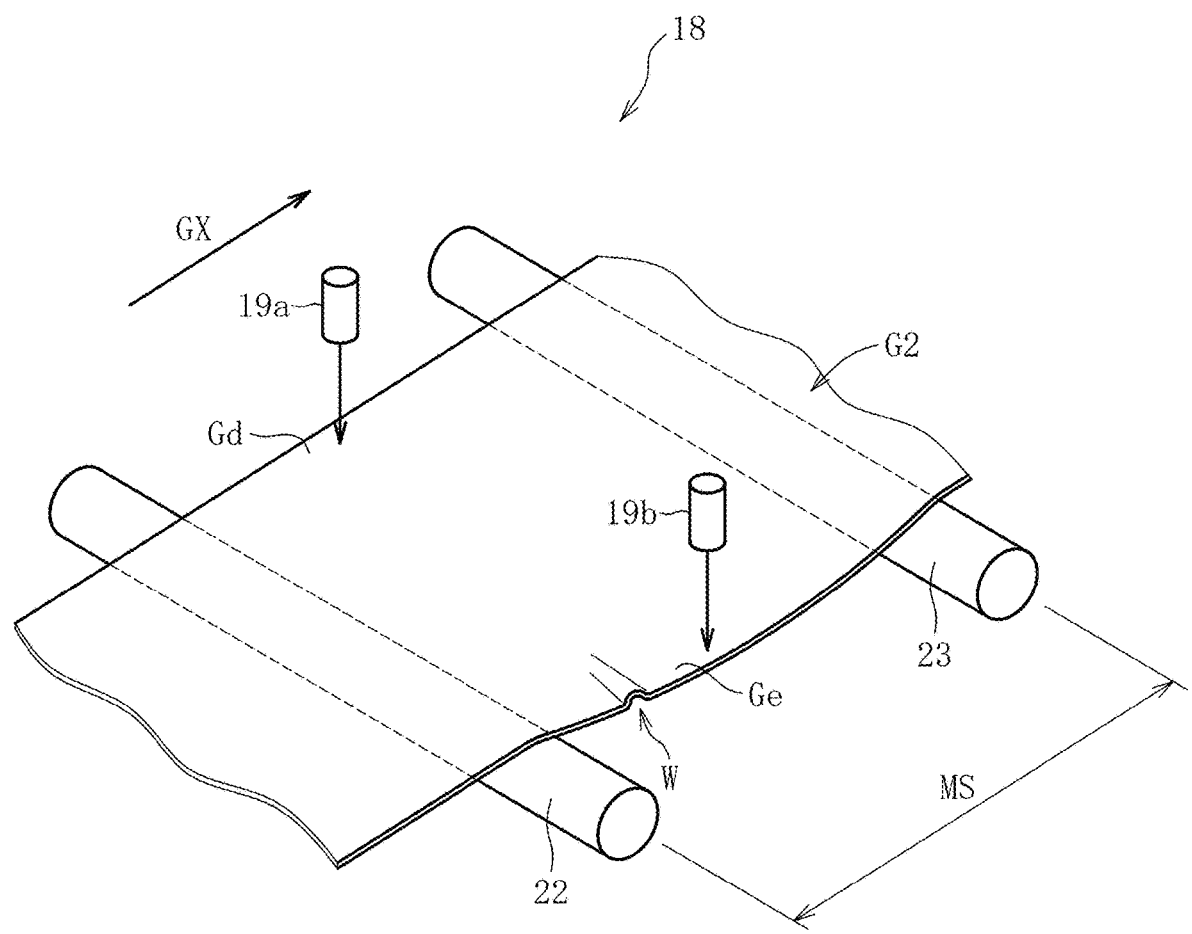
FIG. 4 is a perspective view for illustrating an inspection step in the conveying step.

The detection units 19a and 19b are arranged above the auxiliary conveying device 20 in the intermediate conveying region MS. In addition, the detection units 19a and 19b are located above the product glass film G2 that passes through the intermediate conveying region MS. The detection units 19a and 19b are each formed of, for example, an ultrasonic distance sensor, but may be formed of various other distance sensors. The detection units 19a and 19b comprise a first detection unit 19a configured to measure the distance from one end portion Gd in the width direction of the product glass film G2 and a second detection unit 19b configured to measure the distance from the other end portion Ge in the width direction of the product glass film G2. As illustrated in FIG. 3 and FIG. 4, the first detection unit 19a and the second detection unit 19b are separated from each other in the width direction (horizontal direction orthogonal to the lateral conveying direction GX) of the product glass film G2. Each of the detection units 19a and 19b is connected to the control device 6.

The auxiliary conveying device 20 is arranged in the intermediate conveying region MS. The auxiliary conveying device 20 comprises: an auxiliary conveying portion 25 that can be brought into contact with the lower surface of the product glass film G2; and a raising and lowering device 26 configured to raise and lower the auxiliary conveying portion 25. The auxiliary conveying portion 25 is formed of, for example, a belt conveyor. However, the present invention is not limited thereto, and the auxiliary conveying portion 25 may be formed of other conveying means. The raising and lowering device 26 is configured to raise the auxiliary conveying portion 25 from a standby position (see FIG. 1) to bring the auxiliary conveying portion 25 into contact with the lower surface of the product glass film G2 in a manufacturing initial stage of the glass roll GR.

The roll-up device 5 is installed on a downstream side of the third conveying device 15. The roll-up device 5 comprises: a roll-up roller 27; a motor (not shown) configured to drive the roll-up roller 27 to rotate; and a protective sheet supply portion 28 configured to supply a protective sheet PS to the roll-up roller 27. The roll-up device 5 is configured to roll-up the product glass film G2 into a roll shape by rotating the roll-up roller 27 with the motor while superposing the protective sheet PS on the product glass film G2 from the protective sheet supply portion 28. The rolled-up product glass film G2 is formed as the glass roll GR.

The roll-up device 5 is configured to apply the tension to the product glass film G2 that passes through the intermediate conveying region MS of the third conveying device 15 with roll-up force. That is, the roll-up device 5 functions also as the tension applying portion configured to apply a tension to the product glass film G2 together with the fixing conveying portion 21 of the third conveying device 15.

The control device 6 comprises, for example, a computer (for example, a PC) equipped with various pieces of hardware, such as a CPU, a ROM, a RAM, an HDD, a monitor, and an input/output interface. The control device 6 is communicably connected to the forming device 2, the lateral conveying device 4, and the roll-up device 5.

The control device 6 comprises: an arithmetic processing unit configured to perform various operations; and a storage unit configured to store data and various programs required for manufacturing the glass roll GR.

The arithmetic processing unit can perform arithmetic processing for controlling, for example, the rotation speed of support rollers 11 in the forming device 2 and the pressing force of the support rollers 11 against the base glass film G1. The arithmetic processing unit can perform arithmetic processing for operating the detection units 19a and 19b. The arithmetic processing unit can perform arithmetic processing for calculating the length of each of the end portions Gd and Ge of the product glass film G2 based on the data measured by the detection units 19a and 19b. Further, the arithmetic processing unit can perform arithmetic processing for adjusting the tension applied to the base glass film G1 in the forming device 2 (support rollers 11) in accordance with the difference between the calculated lengths of the end portions Gd and Ge.

The storage unit stores a program for controlling the rotation speed of the support rollers 11 in the forming device 2 and the pressing force (holding force) of the support rollers 11 against the base glass film G1, a program for controlling the conveyance speed of each of the glass films G1 and G2 in the lateral conveying device 4, a program for controlling the suction force of the product glass film G2 by the fixing conveying portion 21 and the roll-up speed and roll-up force of the product glass film G2 in the roll-up device 5, and the like.

In addition, the storage unit stores a program for calculating the length of each of the end portions Gd and Ge of the product glass film G2 and the difference therebetween based on the data measured by each of the detection units 19a and 19b of the third conveying device 15. Further, the storage unit can store the data measured by each of the detection units 19a and 19b of the third conveying device 15.

Now, a method of manufacturing the glass roll GR through use of the manufacturing apparatus 1 having the above-mentioned configuration is described. This method comprises: a forming step of forming the base glass film G1; a conveying step of conveying each of the glass films G1 and G2; and a roll-up step of rolling up the product glass film G2 into a roll shape.

In the forming step, the molten glass overflowing from the upper part of the overflow groove 7a of the forming body 7 in the forming device 2 is caused to flow down along both side surfaces of the forming body 7 to be joined at a lower end of the forming body 7, to thereby form the molten glass into a film shape. At this time, the shrinkage of the molten glass in a width direction is controlled with the edge rollers 8, and thus the base glass film G1 having a predetermined width is formed. After that, strain removal treatment is performed on the base glass film G1 with the annealer 9. The base glass film G1 having a predetermined thickness is formed through an action of a tension applied by the support rollers 11.

In the conveying step, the conveying direction of the base glass film G1 formed in the forming step is converted from the vertical direction to the lateral conveying direction GX by the direction conversion device 3. In the conveying step, the base glass film G1 is conveyed by the first conveying device 13 and the second conveying device 14, and the product glass film G2 is conveyed by the second conveying device 14 and the third conveying device 15.

The conveying step comprises: a cutting step of dividing the base glass film G1 into the non-product portions Gc and the product glass film G2; and an inspection step of inspecting the product glass film G2.

In the cutting step, while the base glass film G1 is sent to a downstream side by the second conveying device 14, part of the base glass film G1 is heated through irradiation with the laser beam by the laser irradiation device 17a in the cutting portion 16. After that, the cooling medium is jetted to the heated site by the cooling device 17b. With this, a thermal stress is generated in the base glass film G1. Initial cracks formed in the base glass film G1 in advance are developed through the thermal stress. With this, the non-product portions Gc and the product glass film G2 are formed from the base glass film G1.

Figure 5:
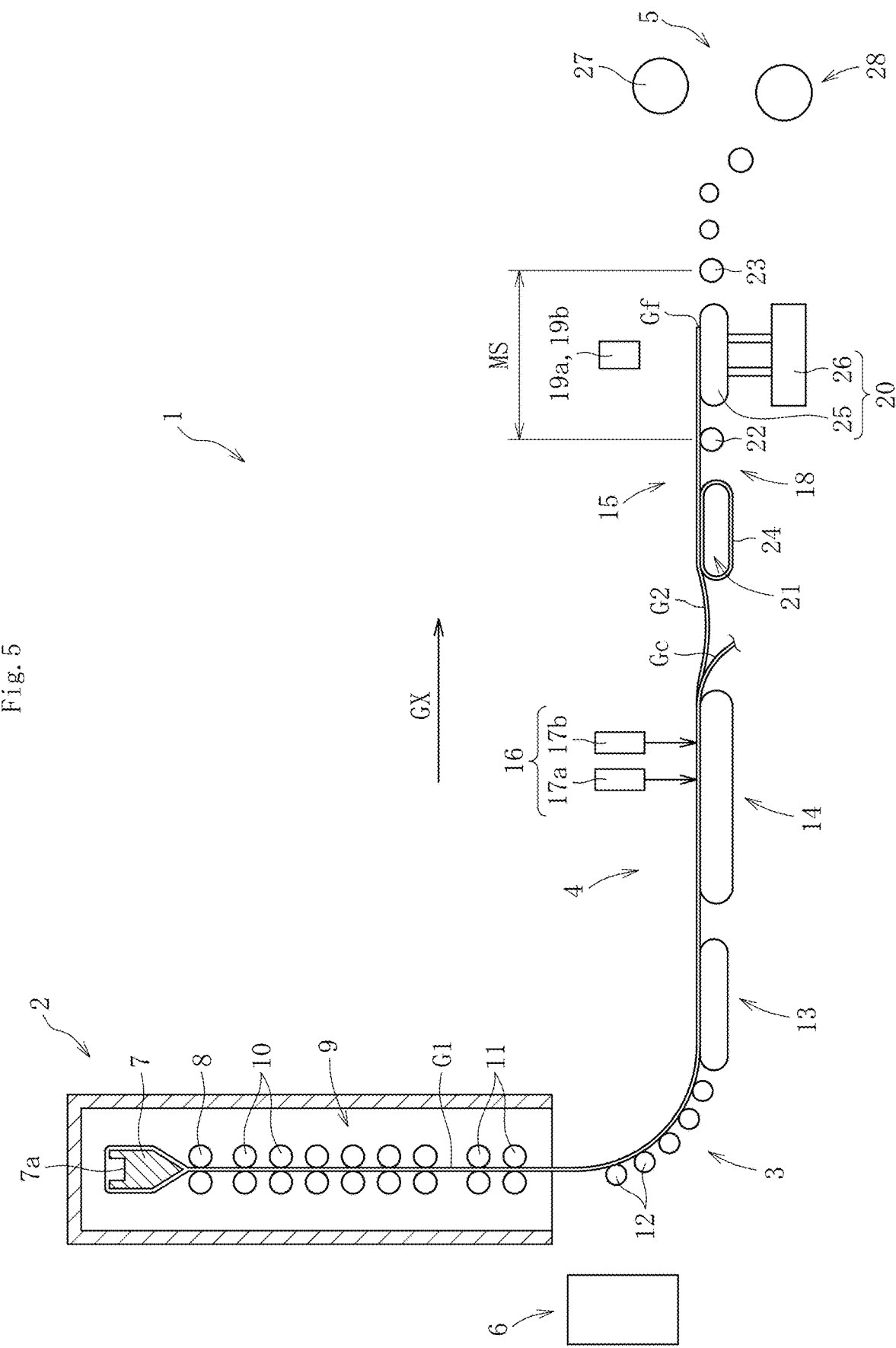
FIG. 5 is a side view for illustrating a preparation step in the method of manufacturing a glass roll.

At the start of production of the glass films G1 and G2, a preparation step of coupling a start end portion Gf of the product glass film G2 to the roll-up device 5 is performed. As illustrated in FIG. 5, in this preparation step, the auxiliary conveying device 20 in the third conveying device 15 is being operated.

That is, the auxiliary conveying device 20 is configured to operate the raising and lowering device 26 to raise the auxiliary conveying portion 25 from the standby position (see FIG. 1). The upper surface of the auxiliary conveying portion 25 is arranged at the same height as those of the first support portion 22 and the second support portion 23. With this arrangement, the auxiliary conveying portion 25 is brought in a state of being capable of supporting the lower surface of the product glass film G2.

The start end portion Gf of the product glass film G2 conveyed from the second conveying device 14 moves from the auxiliary conveying portion 25 to the second support portion 23. The start end portion Gf is conveyed further to a downstream side and coupled to the roll-up roller 27 of the roll-up device 5. When the coupling of the product glass film G2 to the roll-up device 5 (preparation step) is completed, the auxiliary conveying device 20 operates the raising and lowering device 26 to lower the auxiliary conveying portion 25 to the standby position.

In the inspection step, a tension is applied to the product glass film G2 that passes through the intermediate conveying region MS after the preparation step in a longitudinal direction by the tension applying portion (fixing conveying portion 21 and roll-up device 5). The product glass film G2 passes through a region below each of the detection units 19a and 19b in a state of being pulled by the fixing conveying portion 21 and the roll-up device 5.

The first detection unit 19a and the second detection unit 19b are configured to measure the distance (displacement) between each of the detection units 19a and 19b and the upper surface of the product glass film G2 that passes through the intermediate conveying region MS. The measured data is transmitted to the control device 6 and stored in the storage unit.

The arithmetic processing unit of the control device 6 can graph the displacement data in each of the end portions Gd and Ge of the product glass film G2 measured by the detection units 19a and 19b and display the graph on the monitor.

Figure 6:
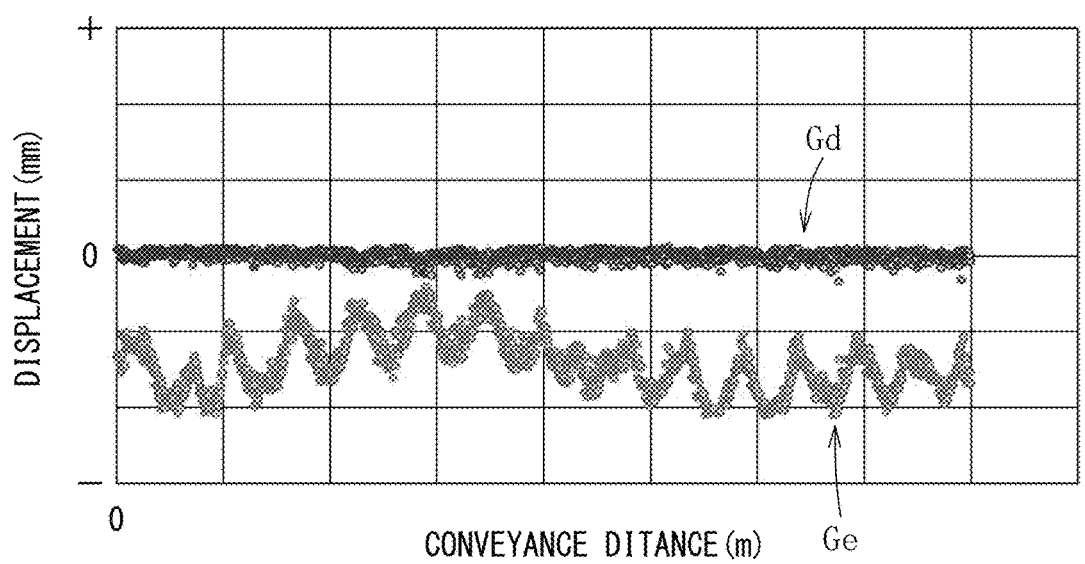
FIG. 6 is a graph for showing an example of measurement data in the inspection step.

In FIG. 6, there is shown an example of a graph to be displayed on the monitor. In this graph, the horizontal axis represents the conveyance distance (m) of the product glass film G2, and the vertical axis represents the displacement (mm) at a measurement site. This graph is obtained by performing measurement on the product glass film G2 that passes through a region below the detection units 19a and 19b for a certain period of time regarding the distance between each of the end portions Gd and Ge of the product glass film G2 and each of the detection units 19a and 19b and showing changes in distance as displacement amounts.

In the graph, the displacement data on the one end portion Gd of the product glass film G2 measured by the first detection unit 19a is shown in a straight line. In addition, in the graph, the data on the other end portion Ge of the product glass film G2 measured by the second detection unit 19b is shown in a polygonal line. Accordingly, in this graph, there is shown that the other end portion Ge of the product glass film G2 is longer than the one end portion Gd. In addition, in this graph, the displacement of the one end portion Gd of the product glass film G2 is almost zero, whereas the displacement of the other end portion Ge is negative. This means that the other end portion Ge of the product glass film G2 is loosened downward as compared to the one end portion Gd.

In addition, in the graph, the measurement data on the other end portion Ge of the product glass film G2 being shown in a broken line means that a crease W (see FIG. 3 and FIG. 4) remaining in the other end portion Ge of the product glass film G2 has been detected by the second detection unit 19b. The crease W appears in the end portions Ga and Gb when the base glass film G1 is produced. Even when the product glass film G2 is formed by the cutting portion 16, a part of the crease W may remain in each of the end portions Gd and Ge of the product glass film G2.

The arithmetic processing unit of the control device 6 calculates the length of each of the end portions Gd and Ge in the width direction of the product glass film G2 having passed through the intermediate conveying region MS for a certain period of time based on the displacement data (data regarding the distance between each of the detection units 19a and 19b and the upper surface of the product glass film G2) measured by the first detection unit 19a and the second detection unit 19b. After that, the arithmetic processing unit calculates the difference between the length of the one end portion Gd in the width direction of the product glass film G2 and the length of the other end portion Ge thereof.

The arithmetic processing unit compares the calculated difference in length to a reference value stored in the storage unit. When the calculated difference in length exceeds the reference value, the arithmetic processing unit transmits a control signal to the forming device 2 in order to reduce the difference in length. The forming device 2 adjusts, for example, the rotation speed of the support rollers 11 or the pressing force (holding force) of the support rollers 11 against the base glass film G1 based on the received control signal.

In the conveying step, the product glass film G2 is conveyed in a loosened state in the region between the second conveying device 14 and the third conveying device 15 (fixing conveying portion 21) (see FIG. 1). In this case, no tension acts on the base glass film G1 cut by the cutting portion 16. As a result, damage caused by the action of the tension can be prevented at a cut site of the base glass film G1.

In the roll-up step, the product glass film G2 conveyed by the third conveying device 15 is rolled up into a roll shape by the roll-up roller 27 of the roll-up device 5 while the protective sheet PS is supplied from the protective sheet supply portion 28 to the product glass film G2. When the product glass film G2 having a predetermined length is rolled up by the roll-up roller 27, the glass roll GR is completed.

Figure 7:
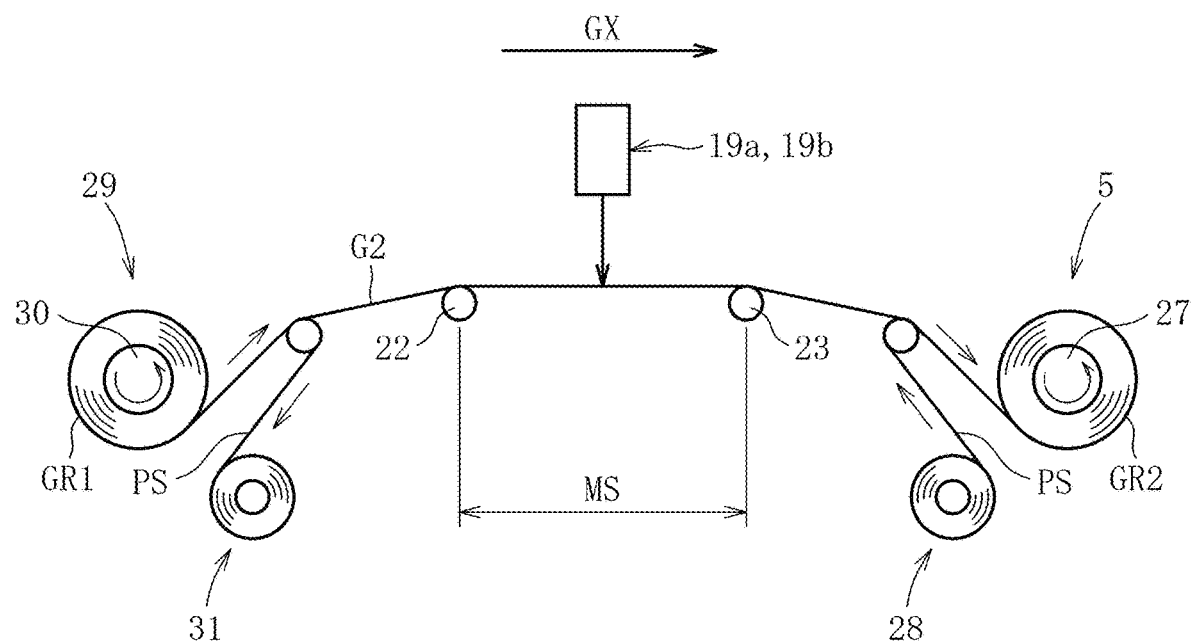
FIG. 7 is a side view for illustrating another example of the conveying step in the method of manufacturing a glass roll.

Regarding the glass roll GR manufactured as described above, roll-to-roll conveyance may be performed later. As illustrated in FIG. 7, in the roll-to-roll conveyance, the product glass film G2 is pulled out from a first glass roll GR1 mounted on a roll-out device 29, and the product glass film G2 is rolled up into a roll shape by the roll-up device 5 arranged at a position away from the roll-out device 29. Thus, a second glass roll GR2 is formed.

In addition to the above-mentioned roll-out device 29 and roll-up device 5, the conveying device (manufacturing apparatus) related to roll-to-roll comprises: the first support portion 22 and the second support portion 23 arranged between the roll-out device 29 and the roll-up device 5; and the detection units 19a and 19b provided in the intermediate conveying region MS between the first support portion 22 and the second support portion 23.

The roll-out device 29 comprises: a roll-out roller 30; a motor (not shown) configured to drive the roll-out roller 30 to rotate; and a protective sheet roll-up portion 31 configured to collect the protective sheet PS pulled out from the first glass roll GR1. The roll-up device 5 has the same configuration as that of the roll-up device 5 of the manufacturing apparatus 1 in FIG. 1.

The detection units 19a and 19b are each formed of a distance sensor such as an ultrasonic distance sensor in the same manner as in the detection units 19a and 19b illustrated in FIG. 1. In the same manner as in the state illustrated in FIG. 4, the first detection unit 19a and the second detection unit 19b are arranged at an interval in the width direction of the product glass film G2. Each of the detection units 19a and 19b can measure the distance between each of the end portions Gd and Ge in the width direction of the product glass film G2 and each of the detection units 19a and 19b (displacement of each of the end portions Gd and Ge). Each of the detection units 19a and 19b may be connected to the control device 6 in FIG. 1 or may be connected to an independent control device.

In this conveyance mode, the roll-out device 29 configured to feed out the product glass film G2 and the roll-up device 5 configured to roll-up the product glass film G2 into a roll shape form the tension applying portion.

In the conveying step in this mode, the product glass film G2 and the protective sheet PS are pulled out from the first glass roll GR1 mounted on the roll-out device 29. The product glass film G2 is conveyed to the roll-up device 5 through the first support portion 22, the intermediate conveying region MS, and the second support portion 23. The protective sheet PS pulled out from the first glass roll GR1 together with the product glass film G2 is rolled up by the protective sheet roll-up portion 31.

In the conveying step, the product glass film G2 that passes through the intermediate conveying region MS is pulled along the longitudinal direction thereof by the roll-out device 29 and the roll-up device 5. As a result, a tension is applied to the product glass film G2.

In the inspection step, the distance between the one end portion Gd in the width direction of the product glass film G2 having the tension applied thereto and the first detection unit 19a is measured by the first detection unit 19a. In addition, the distance between the other end portion Ge in the width direction of the product glass film G2 and the second detection unit 19b is measured by the second detection unit 19b. The data measured by each of the detection units 19a and 19b is transmitted to the control device.

Based on the measurement data received from each of the detection units 19a and 19b, the arithmetic processing unit of the control device calculates the length of each of the end portions Gd and Ge in the width direction of the product glass film G2 having passed through the intermediate conveying region MS for a certain period of time. The arithmetic processing unit calculates the difference between the calculated length of the one end portion Gd of the product glass film G2 and the calculated length of the other end portion Ge thereof. The arithmetic processing unit compares the difference in length to the reference value stored in the storage unit. When the difference in length exceeds the reference value, the arithmetic processing unit determines that the first glass roll GR1 (or the second glass roll GR2) is a defective product.

In the roll-up step according to this mode, the product glass film G2 having passed through the second support portion 23 is rolled up into a roll shape by the roll-up roller 27 of the roll-up device 5. In this case, the protective sheet PS from the protective sheet supply portion 28 is superposed on the product glass film G2. As a result, the second glass roll GR2 is formed on the roll-up device 5.

According to the method of manufacturing the glass roll GR according to this embodiment described above, in the inspection step, the product glass film G2 can be supported and conveyed in a stable posture by being conveyed under a state in which a tension is applied to the product glass film G2. As a result, the state (length) of each of the end portions Gd and Ge in the width direction of the product glass film G2 can be measured by the detection units 19a and 19b with satisfactory accuracy.

In this method, when the control (feedback control) of the support rollers 11 in the forming device 2 is performed based on the information regarding the length of each of the end portions Gd and Ge of the product glass film G2 measured in the inspection step, the difference in length between the end portions Gd and Ge can be reduced to the extent possible. As a result, the product glass film G2 with high dimensional accuracy can be produced, and eventually a high-quality glass roll GR can be manufactured.

The present invention is not limited to the configurations of the above-mentioned embodiment. In addition, the action and effect of the present invention are not limited to those described above. The present invention may be modified in various forms within the range not departing from the spirit of the present invention.

In the example of FIG. 7 described above, there is illustrated an example in which the inspection step is performed while the product glass film G2 is conveyed by the roll-to-roll conveyance, but the present invention is not limited to this configuration. In the method of manufacturing a glass roll according to the present invention, a cleaning step, a film forming step, and other manufacturing-related processing steps may be performed before and after this inspection step.

In the above-mentioned embodiment, there is described an example in which the base glass film G1 is formed by the overflow down-draw method. However, as modification examples of this embodiment, the base glass film G1 may be formed by a slot down-draw method, a redraw method, a float method, or the like.

In the above-mentioned embodiment, there is described an example in which the fixing conveying portion 21 of the third conveying device 15 is formed of the suction conveyor, but the present invention is not limited to this configuration. The fixing conveying portion 21 may be formed of, for example, a suction roller, a nip roller, or other conveying means capable of applying a tension to the product glass film G2.

In the above-mentioned embodiment, there is described an example in which the state of each of the end portions Gd and Ge of the product glass film G2 is measured by the detection units 19a and 19b each formed of a distance sensor, but the present invention is not limited to this configuration. The detection units 19a and 19b may be each formed of an image pickup device or other measuring devices capable of imaging each of the end portions Gd and Ge of the product glass film G2. In addition, the detection unit according to the present invention may comprise a third detection unit configured to measure the state (length) of a center portion in the width direction of the product glass film G2.

REFERENCE SIGNS LIST 2 forming device
4 lateral conveying device
5 roll-up device
19a first detection unit
19b second detection unit
20 auxiliary conveying device
21 fixing conveying portion
22 first support portion
23 second support portion
29 roll-out device
G1 base glass film
G2 product glass film
Gd one end portion in width direction of product glass film
Ge other end portion in width direction of product glass film
GR glass roll
GR1 first glass roll
GR2 second glass roll
GX lateral conveying direction
MS intermediate conveying region

The invention claimed is:

1. A method of manufacturing a glass roll, the method comprising:
a conveying step of conveying a band-shaped glass film in a lateral conveying direction by a conveying device; and
a roll-up step of rolling up the band-shaped glass film into a roll shape,
wherein the conveying device comprises:
a first support portion and a second support portion which are arranged at an interval along the lateral conveying direction, and which are each configured to support the band-shaped glass film;
an intermediate conveying region formed between the first support portion and the second support portion;
a tension applying portion configured to apply a tension to the band-shaped glass film that passes through the intermediate conveying region;
a detection unit configured to measure a state of each of end portions in a width direction of the band-shaped glass film that passes through the intermediate conveying region; and
a control device configured to calculate a length of each of the end portions of the band-shaped glass film based on data measured by the detection unit,
wherein the conveying step comprises an inspection step of measuring the state of each of the end portions of the band-shaped glass film by the detection unit under a state in which the tension is applied to the band-shaped glass film that passes through the intermediate conveying region by the tension applying portion, and
wherein, in the inspection step, the control device calculates the length of each of the end portions of the band-shaped glass film based on the data measured by the detection unit, and then calculates a difference between the length of one of the end portions of the band-shaped glass film and the length of another of the end portions of the band-shaped glass film.

2. The method of manufacturing a glass roll according to claim 1, wherein the detection unit comprises:
a first detection unit configured to measure a distance from the one of the end portions in the width direction of the band-shaped glass film that passes through the intermediate conveying region; and
a second detection unit configured to measure a distance from the another of the end portions in the width direction of the band-shaped glass film.

3. The method of manufacturing a glass roll according to claim 2, wherein the tension applying portion comprises:
a roll-out device configured to feed out the band-shaped glass film; and
a roll-up device configured to roll-up the band-shaped glass film into the roll shape.

4. The method of manufacturing a glass roll according to claim 3,
wherein the conveying device is arranged in the intermediate conveying region, and comprises an auxiliary conveying device configured to convey the band-shaped glass film, and
wherein the detection unit is arranged above the auxiliary conveying device.

5. The method of manufacturing a glass roll according to claim 2, further comprising, before the conveying step, a forming step of forming the band-shaped glass film by forming a molten glass by a forming device,
wherein the tension applying portion comprises:
a fixing conveying portion configured to convey the band-shaped glass film under a state in which the band-shaped glass film is fixed and held; and
a roll-up device configured to roll-up the band-shaped glass film into the roll shape.

6. The method of manufacturing a glass roll according to claim 5, wherein the fixing conveying portion comprises a suction conveyor.

7. The method of manufacturing a glass roll according to claim 6,
wherein the conveying device is arranged in the intermediate conveying region, and comprises an auxiliary conveying device configured to convey the band-shaped glass film, and
wherein the detection unit is arranged above the auxiliary conveying device.

8. The method of manufacturing a glass roll according to claim 5,
wherein the conveying device is arranged in the intermediate conveying region, and comprises an auxiliary conveying device configured to convey the band-shaped glass film, and
wherein the detection unit is arranged above the auxiliary conveying device.

9. The method of manufacturing a glass roll according to claim 5, wherein, in the forming step, the forming device adjusts the tension applied to the band-shaped glass film in accordance with the state of each of the end portions of the band-shaped glass film detected by the detection unit.

10. The method of manufacturing a glass roll according to claim 2,
wherein the conveying device is arranged in the intermediate conveying region, and comprises an auxiliary conveying device configured to convey the band-shaped glass film, and
wherein the detection unit is arranged above the auxiliary conveying device.

11. The method of manufacturing a glass roll according to claim 1, wherein the tension applying portion comprises:
a roll-out device configured to feed out the band-shaped glass film; and
a roll-up device configured to roll-up the band-shaped glass film into the roll shape.

12. The method of manufacturing a glass roll according to claim 11, wherein the roll-up device is configured to apply the tension to the band-shaped glass film that passes through the intermediate conveying region with roll-up force.

13. The method of manufacturing a glass roll according to claim 11,
wherein the conveying device is arranged in the intermediate conveying region, and comprises an auxiliary conveying device configured to convey the band-shaped glass film, and
wherein the detection unit is arranged above the auxiliary conveying device.

14. The method of manufacturing a glass roll according to claim 1, further comprising, before the conveying step, a forming step of forming the band-shaped glass film by forming a molten glass by a forming device,
wherein the tension applying portion comprises:
a fixing conveying portion configured to convey the band-shaped glass film under a state in which the band-shaped glass film is fixed and held; and
a roll-up device configured to roll-up the band-shaped glass film into the roll shape.

15. The method of manufacturing a glass roll according to claim 14, wherein the fixing conveying portion comprises a suction conveyor.

16. The method of manufacturing a glass roll according to claim 15,
wherein the conveying device is arranged in the intermediate conveying region, and comprises an auxiliary conveying device configured to convey the band-shaped glass film, and
wherein the detection unit is arranged above the auxiliary conveying device.

17. The method of manufacturing a glass roll according to claim 15, wherein, in the forming step, the forming device adjusts the tension applied to the band-shaped glass film in accordance with the state of each of the end portions of the band-shaped glass film detected by the detection unit.

18. The method of manufacturing a glass roll according to claim 14, wherein, in the forming step, the forming device adjusts the tension applied to the band-shaped glass film in accordance with the state of each of the end portions of the band-shaped glass film detected by the detection unit.

19. The method of manufacturing a glass roll according to claim 14,
wherein the conveying device is arranged in the intermediate conveying region, and comprises an auxiliary conveying device configured to convey the band-shaped glass film, and
wherein the detection unit is arranged above the auxiliary conveying device.

20. The method of manufacturing a glass roll according to claim 1,
wherein the conveying device is arranged in the intermediate conveying region, and comprises an auxiliary conveying device configured to convey the band-shaped glass film, and
wherein the detection unit is arranged above the auxiliary conveying device.

21. A method of manufacturing a glass roll, the method comprising:

a conveying step of conveying a band-shaped glass film in a lateral conveying direction by a conveying device;

before the conveying step, a forming step of forming the band-shaped glass film by forming a molten glass by a forming device; and a roll-up step of rolling up the band-shaped glass film into a roll shape, wherein the conveying device comprises:

a first support portion and a second support portion which are arranged at an interval along the lateral conveying direction, and which are each configured to support the band-shaped glass film;

an intermediate conveying region formed between the first support portion and the second support portion;

a tension applying portion configured to apply a tension to the band-shaped glass film that passes through the intermediate conveying region; and a detection unit configured to measure a state of each of end portions in a width direction of the band-shaped glass film that passes through the intermediate conveying region, wherein the conveying step comprises an inspection step of measuring the state of each of the end portions of the band-shaped glass film by the detection unit under a state in which the tension is applied to the band-shaped glass film that passes through the intermediate conveying region by the tension applying portion, wherein the tension applying portion comprises:

a fixing conveying portion configured to convey the band-shaped glass film under a state in which the band-shaped glass film is fixed and held; and a roll-up device configured to roll-up the band-shaped glass film into the roll shape, and wherein the fixing conveying portion comprises a suction conveyor.

* * * * *